(12) United States Patent
Bagnasco et al.

(10) Patent No.: US 6,993,241 B2
(45) Date of Patent: Jan. 31, 2006

(54) BRAGG GRATING OPTICAL FIBER

(75) Inventors: Mara Bagnasco, Savona (IT); Valeria Gusmeroli, Milan (IT)

(73) Assignee: Corning Incorporated, Corning, NY (US)

( * ) Notice: Subject to any disclaimer, the term of this patent is extended or adjusted under 35 U.S.C. 154(b) by 223 days.

(21) Appl. No.: 10/658,606

(22) Filed: Sep. 8, 2003

(65) Prior Publication Data

US 2004/0071432 A1  Apr. 15, 2004

(51) Int. Cl.
*G02B 6/16* (2006.01)
*G02B 6/34* (2006.01)

(52) U.S. Cl. .................. 385/142; 385/37; 385/143
(58) Field of Classification Search .............. 385/37, 385/141–145
See application file for complete search history.

(56) References Cited

U.S. PATENT DOCUMENTS

| | | | |
|---|---|---|---|
| 5,157,747 A | 10/1992 | Aktins et al. | 385/37 |
| 5,381,503 A | 1/1995 | Kanamori et al. | 385/123 |
| 5,790,726 A | 8/1998 | Ito et al. | 385/37 |
| 5,881,197 A * | 3/1999 | Dong et al. | 385/127 |
| 6,075,625 A | 6/2000 | Ainslie et al. | 359/3 |
| 6,157,758 A | 12/2000 | Abe et al. | 385/37 |
| 6,221,555 B1 | 4/2001 | Murakami et al. | 430/270.1 |
| 6,229,945 B1 | 5/2001 | Ainslie et al. | 385/123 |
| 6,314,221 B1 | 11/2001 | Riant et al. | 385/37 |
| 6,321,007 B1 | 11/2001 | Sanders | 385/37 |
| 6,336,749 B1 | 1/2002 | O'Toole et al. | 385/96 |
| 6,400,868 B1 | 6/2002 | Riant et al. | 385/37 |
| 2004/0086245 A1 * | 5/2004 | Farroni et al. | 385/123 |

FOREIGN PATENT DOCUMENTS

| | | |
|---|---|---|
| EP | 0 585 533 B1 | 8/1998 |
| WO | WO 96/23739 | 8/1996 |
| WO | WO 00/19256 | 4/2000 |
| WO | WO 01/22136 | 3/2001 |

OTHER PUBLICATIONS

Starodubov et al., "Bragg grating fabrication in germano-silicate fibers by use of near-UV light: a new pathway for refractive index changes", Optics Letters, vol. 22, No. 14, Jul. 15, 1997, p. 1086-1088.

Grubsky, et al., "Photochemical reaction of hydrogen with germanosilicate glass initiated by 3.4-5.4-eV ultraviolet light", Optics Letters, vol. 24, No. 11, Jun. 1, 1999, p. 729-731.

Dianov et al., "Refractive-index gratings written by near-ultraviolet radiation", Optics Letters, vol. 22, No. 4, Feb. 15, 1997 p. 221-223.

Williams et al., "Photosensitive index changes in germania doped silica glass fibers and waveguides" BT Labs.

Riant et al., "Influence of fiber drawing tension on photosensitivity in hydrogenated and nonhydrogenated fibers", OFC 1998 Technical Digest Tuesday Morning, p. 1-2.

(Continued)

Primary Examiner—Rodney Bovernick
Assistant Examiner—Omar Rojas
(74) Attorney, Agent, or Firm—Svetlana Z. Short

(57) ABSTRACT

The present invention provides an optical fiber providing high photosensitivity in the absence of hydrogen loading as well as a low numerical aperture. One aspect of the present invention relates to an optical fiber including a core, the core comprising silica doped with at least about 6 mol % germania and at least about 0.9 wt % fluorine; and a cladding surrounding the core. The optical fiber of the present invention is suitable for the production of fiber Bragg gratings.

17 Claims, 2 Drawing Sheets

OTHER PUBLICATIONS

Lemaire et al., "High Pressure $H_2$ loading as a technique for achieving ultrahigh UV photosensitivity and thermal sensitivity in $GeO_2$ doped optical fibres", Electronics Letters, vol. 29, No. 13, Jun. 24, 1993, p. 1191-1193.

Williams et al., "Enhanced UV Photosensitivity in boron codoped germanosilicate fibres", Electronics Letters, vol. 29, No. 1, Jan. 7, 1993, p. 45-47.

Poignant et al., "Effect of some refractive index modifiers on both numerical aperture and mechanical strength of fluorozirconate fibres", Journal of Non-Crystalline Solids, 161 (1993) 192-197.

Fokine "Thermal stability of chemical composition gratings in fluorine-germanium-doped silica fibers", Optics Letters, vol. 27, No. 12, Jun. 15, 2002, p. 1016-1018.

Fonjallaz et al., "Tension increase correlated to refractive-index change in fibers containing UV-written Bragg gratings", Optics Letters, vol. 20, No. 11, Jun. 1, 1995, p. 1346-1348.

Williams et al., "Accelerated lifetime tests on UV written intra-core gratings in boron germania codoped silica fibre", Electronics Letters, vol. 31, No. 24, Nov. 23, 1995, p. 2120-2121.

* cited by examiner

BRAGG GRATING OPTICAL FIBER

CROSS-REFERENCE TO RELATED APPLICATIONS

This application claims the benefit of priority of European Patent Application Serial No. 02079235.4 filed on Oct. 10, 2002, which is incorporated by reference herein in its entirety.

BACKGROUND OF THE INVENTION

1. Field of the Invention

The present invention relates generally to optical communications, and more specifically to optical fibers suitable for the fabrication of fiber Bragg gratings.

2. Technical Background

A high performance optical telecommunication system carries high data rates over long distances with no electronic regeneration. For example, rates of 10 Gb/s or more over unregenerated distances of three to five hundred kilometers have been achieved. A high performance system may employ high power signal lasers, optical amplifiers, dispersion compensation devices, optical switching devices, and may use wavelength division multiplexing. Optical telecommunications systems are progressing toward higher speeds and longer span lengths, making the requirements for system components more and more arduous.

One such system component is a fiber Bragg grating. A fiber Bragg grating is formed from a periodic modulation of the refractive index of the core of an optical fiber. Fiber Bragg gratings act to selectively retroreflect a single wavelength from a band of wavelengths propagating in an optical fiber. Fiber Bragg gratings have found utility in diverse applications such as laser stabilization, wavelength division multiplexing, gain flattening of amplifiers, and dispersion compensation.

Fiber Bragg gratings are conventionally fabricated by exposing an optical fiber with a photosensitive core to a pattern of UV radiation having a desired intensity modulation. The pattern of the UV radiation is generally formed using interferometric techniques, such as by passing the radiation through a phase mask. In order to fabricate an effective grating, it is desirable to have an optical fiber having a high photosensitivity. Conventional photosensitive optical fibers have a relatively high concentration of germania in their cores. While increasing the germania content acts to increase the photosensitivity of the core, it also acts to increase the refractive index of the core, and therefore the $\Delta$ and the numerical aperture of the optical fiber. Optical fibers having high $\Delta$ and numerical aperture tend not to couple well to standard single mode optical fibers. As such, fiber Bragg gratings written in conventional optical fibers having a high germania content in the core may have high coupling losses to other optical fibers, and therefore be disadvantaged for use in optical telecommunications systems.

Another method of increasing the photosensitivity of a germania-containing optical fiber is to load the optical fiber with molecular hydrogen under conditions of high pressure. While hydrogen loading is a useful method in the fabrication of fiber Bragg gratings, it adds the extra process steps of hydrogen loading and post-exposure annealing and requires the use of high pressures of a highly flammable gas.

Conventional photosensitive optical fibers do not provide for the manufacture of optical fiber Bragg gratings with the desired performance and simplicity of manufacture. There remains a need for an optical fiber that exhibits high photosensitivity and desirably low numerical aperture. From the cost and process point of view, it is further to have a photosensitive optical fiber that may be used in the manufacture of fiber Bragg gratings without hydrogen loading.

DEFINITIONS

The following definitions are in accord with common usage in the art.

The refractive index profile is the relationship between refractive index and optical fiber radius.

Delta, $\Delta$, is the relative refractive index percent, $\Delta = (n_i^2 - n_c^2)/2n_c^2$, where $n_i$ is the specified refractive index in region i, and $n_c$ is the average refractive index of the cladding region. Deltas are conventionally expressed as percents.

The term $\alpha$-profile refers to a refractive index profile, expressed in terms of $\Delta(b)$, where b is radius, which follows the equation $$\Delta(b) = \Delta(b_0)(1 - [|b - b_0|/(b_1 - b_0)]^{\alpha})$$

where $b_0$ is the point at which $\Delta(b)$ is maximum, $b_1$ is the point at which $\Delta(b)\%$ is zero, and b is in the range $b_i \leq b \leq b_f$, where delta is defined above, $b_i$ is the initial point of the $\alpha$-profile, $b_f$ is the final point of the $\alpha$-profile, and $\alpha$ is an exponent which is a real number.

SUMMARY OF THE INVENTION

One aspect of the present invention relates to an optical fiber including a core, the core including silica doped with at least about 6 mol % germania and at least about 0.9 wt % fluorine; and a cladding surrounding the core.

Another aspect of the present invention relates to an optical fiber including a core, the core including silica doped with at least about 6 mol % germania and with fluorine; and a cladding surrounding the core, wherein the optical fiber has a numerical aperture of less than about 0.22 at 1550 nm.

Another aspect of the present invention relates to a method of fabricating a fiber Bragg grating, the method including the steps of providing an optical fiber including a core, the core including silica doped with at least about 6 mol % germanium and at least about 0.9 wt % fluorine, and a cladding surrounding the core; and exposing a section of the optical fiber to patterned UV radiation, thereby writing the grating in the core of the fiber.

The optical fibers of the present invention result in a number of advantages over prior art optical fibers. For example, the optical fibers of the present invention have high photosensitivity while maintaining a desirably low numerical aperture. The skilled artisan may essentially independently adjust photosensitivity and numerical aperture by judiciously selecting dopant levels. The optical fibers of the present invention may have high glass homogeneity and uniformity, and thus low optical loss due to scattering. Fiber Bragg gratings using the optical fibers of the present invention may be fabricated without the use of a hydrogen loading process. Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings are not necessarily to scale. The drawings illustrate one or more embodiment(s) of the invention, and together with the description serve to explain the principles and operation of the invention.

DETAILED DESCRIPTION OF THE PREFERRED EMBODIMENTS

Figure 1:
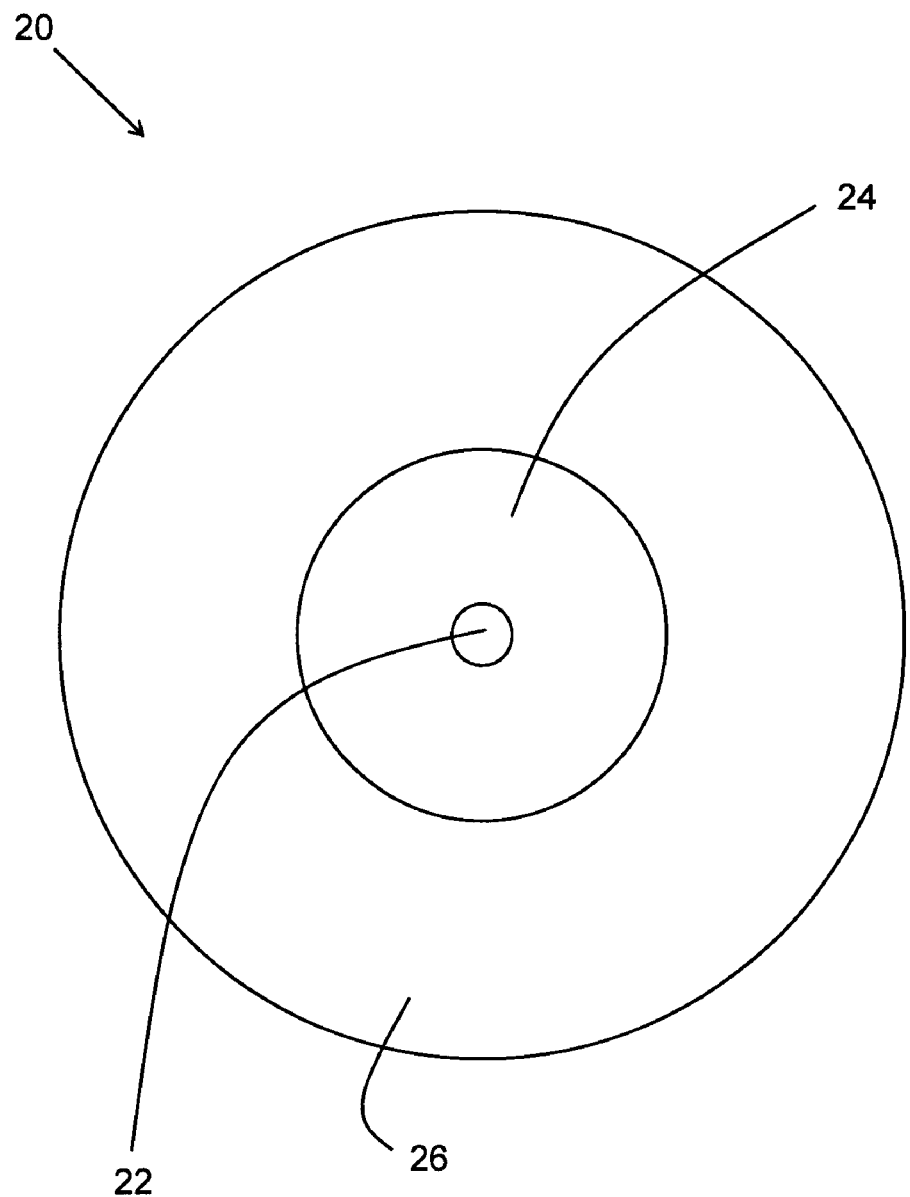
FIG. 1 is a cross-sectional view of an optical fiber according to one embodiment of the present invention.

The invention disclosed and described herein relates to an optical fiber suitable for the manufacture of fiber Bragg gratings. According to one aspect of the invention, an optical fiber includes a core including silica doped with at least about 6 mol % germania and with at least about 0.9 wt % fluorine. One embodiment of an optical fiber of the present invention is shown in cross-sectional view in FIG. 1. Optical fiber 20 includes a core 22, and a cladding 24. The core is substantially disposed about the centerline of the fiber, and may have any desired refractive index profile shape, including, for example, a step profile, a rounded step profile, a trapezoidal profile, a rounded trapezoidal profile, or an (α-profile. It is noted that the dopant levels recited herein are taken at the maximum index of the profile. It will be appreciated by the skilled artisan that the refractive index profile may have an index depression along the centerline. The cladding may be substantially uniform in index, and formed from a single material, such as undoped silica or phosphorus-fluorine co-doped silica. The cladding may alternatively include a plurality of differently-doped layers, as would be familiar to the skilled artisan. For example, the cladding may include a germania-fluorine co-doped silica inner cladding and a phosphorus-fluorine co-doped silica outer cladding. As is customary, the fiber may be coated with one or more layers of polymer coatings 26.

According to one embodiment of the present invention, an optical fiber is doped with at least about 6 mol % germania, and at least about 0.9 wt % fluorine in the core of the fiber. The core of the optical fiber may suitably be doped with at least about 7 mol % germania. The photosensitivity of the core of the fiber will be strongly dependent on the amount of germania. The core of the optical fiber may suitably be doped with at least about 1.2 wt % fluorine. The Δ and the numerical aperture of the fiber will be dependent on the relative amounts of germania, fluorine, and other dopants in the core and the cladding. Increased amounts of germania in the core will raise the index of the core, and therefore increase the Δ and the numerical aperture of the fiber. Increased amounts of fluorine in the core will decrease the index of the core, and therefore decrease the Δ and the numerical aperture. As such, the increase in Δ and numerical aperture caused by higher amounts of germania can be counteracted by the use of higher amounts of fluorine. The skilled artisan will adjust the amounts of germania and fluorine in the core of the fiber to yield a desired level of photosensitivity and a desired numerical aperture. In desirable embodiments of the invention, the core of the optical fiber is doped with between about 0.9 wt % and about 6 wt % fluorine; and with between about 6 mol % and about 30 mol % germania.

In one embodiment of the present invention, the core of the optical fiber includes silica, germania, and fluorine as described above, with no other dopants being present in the core in substantial amounts. For example, in one embodiment of the invention, the core of the optical fiber contains less than about 0.1 wt % of dopants other than germania or fluorine. Optical fibers according to this embodiment of the invention may be advantageous due to low loss and simplified manufacture.

According to another embodiment of the invention, an optical fiber includes a core doped with fluorine and with at least about 6 mol % germania, the optical fiber having a numerical aperture of less than about 0.22. Especially desirable optical fibers have a numerical aperture of less than about 0.16. In designing optical fibers according to this embodiment of the invention, the skilled artisan can select a concentration of germania to yield a desired photosensitivity, and select an amount of fluorine to yield a desired numerical aperture.

According to one embodiment of the present invention, the core of the optical fiber is substantially devoid of boron. For example, in one embodiment of the invention, the core of the optical fiber contains less than about 0.1 wt % boron oxide. Inclusion of boron in a germania-doped material can cause poor homogeneity and uniformity. Gratings fabricated in a germania-doped fiber including boron in the core require a strong post-exposure annealing step, making the grating fabrication process somewhat more complex and time-consuming.

Germania concentration, fluorine concentration, and numerical aperture for three step index optical fibers according to one embodiment of the present invention and two conventional fibers are shown in Table 1. The cores are formed from silica doped with germania and fluorine as shown in Table 1. Fibers 1, 2 and 3 have core radii of 3 µm, 2.5 µm, and 2 µm, respectively. The skilled artisan will recognize that the optical fibers of the present invention may have substantially different core radii than those of the fibers of Table 1, depending on desired optical properties. In the fibers of Table 1, the cladding is phosphorus-fluorine co-doped silica, and is index-matched to undoped silica. Conventional fibers germania-doped fibers A and B have substantially no fluorine in the core. The fibers were fabricated using standard MCVD methods.

TABLE 1

| FIBER | Germania concentration of core (mol %) | Fluorine concentration of core (wt %) | Numerical aperture (1550 nm) |
|---|---|---|---|
| Fiber 1 | 7.2 | 1.5 | 0.12 |
| Fiber 2 | 7.8 | 1.5 | 0.14 |
| Fiber 3 | 12.5 | 1.5 | 0.195 |
| Conv. Fiber A | 5.2 | 0 | 0.14 |
| Conv. Fiber B | 9.5 | 0 | 0.195 |

Germania concentrations were measured using scanning electron microscopy. Fluorine concentrations were computed from the measured germania concentrations and the measured numerical apertures of the fibers. Fibers 1, 2 and 3 of Table 1 have high germania concentrations in their cores, yet have desirably low numerical aperture values. In order to allow for efficient splicing to conventional optical fibers, it is desirable for the numerical aperture of the fibers of the present invention to be less than about 0.22 at 1550 nm. For splicing to certain low numerical aperture conventional optical fibers, it may be desirable for the optical fibers of the present invention to have a numerical aperture of 0.16 at 1550 nm. For example, fiber 1 has a numerical aperture of 0.12 at 1550 nm, making it suitable for splicing to SMF-28® single mode fiber, available from Corning Incorporated of Corning, N.Y. Fiber 2 has a numerical aperture of 0.14 at 1550 nm, and is suitable for splicing to PUREMODE™ HI 1060 fiber, available from Corning Incorporated of Corning, N.Y. Fiber 3 has a numerical aperture of 0.195 at 1550 nm, and is suitable for splicing to PUREMODE™ HI 980 fiber, available from Corning Incorporated of Corning, N.Y. Fibers 2 and 3 have the same numerical aperture values as conventional fibers A and B, respectively, but have much higher germania concentrations.

Table 2 shows the photosensitivity of the optical fibers of Table 1. Bragg gratings were written into the fibers without hydrogen loading using an excimer UV source operating at a wavelength of 244 nm. The source was pulsed at 70 Hz, with an energy of 200 mJ/pulse. The writing energy was passed through a variable attenuator set at 17% transmission, then though a phase mask. The visibility of the interference fringes [(max. intensity−min. intensity)/max. intensity] was about 80%. Calculated refractive index changes are given for both a three minute exposure and a saturating exposure. As used herein, a saturating exposure is an exposure sufficient for the optical fiber to reach its maximum UV-induced index change (i.e. a maximum Bragg grating strength).

TABLE 2

| FIBER | Refractive index change at 1550 nm (3 minute exposure) | Refractive index change at 1550 nm (saturation) |
|---|---|---|
| Fiber 1 | $5.8 \times 10^{-4}$ | no data |
| Fiber 2 | $6.2 \times 10^{-4}$ | $1.6 \times 10^{-3}$ |
| Fiber 3 | $9.2 \times 10^{-4}$ | no data |
| Conv. Fiber A | $3.7 \times 10^{-4}$ | no data |
| Conv. Fiber B | $5.1 \times 10^{-4}$ | $1.5 \times 10^{-3}$ |

The fibers of the present invention have higher photosensitivities than analogous germania-doped fibers without fluorine in the core. For example, while fiber 2 and conventional fiber A have similar numerical apertures, the photosensitivity of fiber 2 is over 165% that of conventional fiber A. Likewise, while fiber 3 and conventional fiber B have similar numerical apertures, the photosensitivity of fiber 3 is over 180% that of conventional fiber B. Desirable fibers of the present invention exhibit an index change at 1550 nm in the core in the absence of hydrogen loading of at least about $5.5 \times 10^{-4}$ upon exposure to a dose of radiation having a wavelength of 244 nm and an energy of 428 J through a phase mask yielding an interference pattern with a visibility of about 80%. Especially desirable fibers of the present invention exhibit an index change at 1550 nm in the core in the absence of hydrogen loading of at least about $6.0 \times 10^{-4}$ upon exposure to a dose of radiation having a wavelength of 244 nm and an energy of 428 J through a phase mask yielding an interference pattern with a visibility of about 80%.

A useful parameter to quantify the photosensitivity of the optical fibers of the present invention is the ratio of the index change at 1550 nm in the core to the numerical aperture of the fiber, the index change being caused by an exposure in the absence of hydrogen loading to a dose of radiation having a wavelength of 244 nm and an energy of 428 J through a phase mask yielding an interference pattern with a visibility of about 80%. Desirable optical fibers of the present invention have a ratio of index change at 1550 nm in the core to numerical aperture of at least about $3.0 \times 10^{-3}$, the index change being caused by an exposure in the absence of hydrogen loading to a dose of radiation having a wavelength of 244 nm and an energy of 428 J through a phase mask yielding an interference pattern with a visibility of about 80%. Especially desirable optical fibers of the present invention have a ratio of index change at 1550 nm in the core to numerical aperture of at least about $4.0 \times 10^{-3}$, the index change being caused by an exposure in the absence of hydrogen loading to a dose of radiation having a wavelength of 244 nm and an energy of 428 J through a phase mask yielding an interference pattern with a visibility of about 80%.

Another useful parameter to quantify the photosensitivity of the optical fibers of the present invention is the ratio of the index change at 1550 nm in the core in the absence of hydrogen loading upon a saturating exposure to the numerical aperture of the fiber. Desirable optical fibers of the present invention have a ratio of saturated index change at 1550 nm in the absence of hydrogen loading to numerical aperture of at least about $9.0 \times^{-2}$.

Especially desirable optical fibers of the present invention have a ratio of saturated index change at 1550 nm in the absence of hydrogen loading to numerical aperture of at least about $1.05 \times 10^{-2}$.

Figure 2:
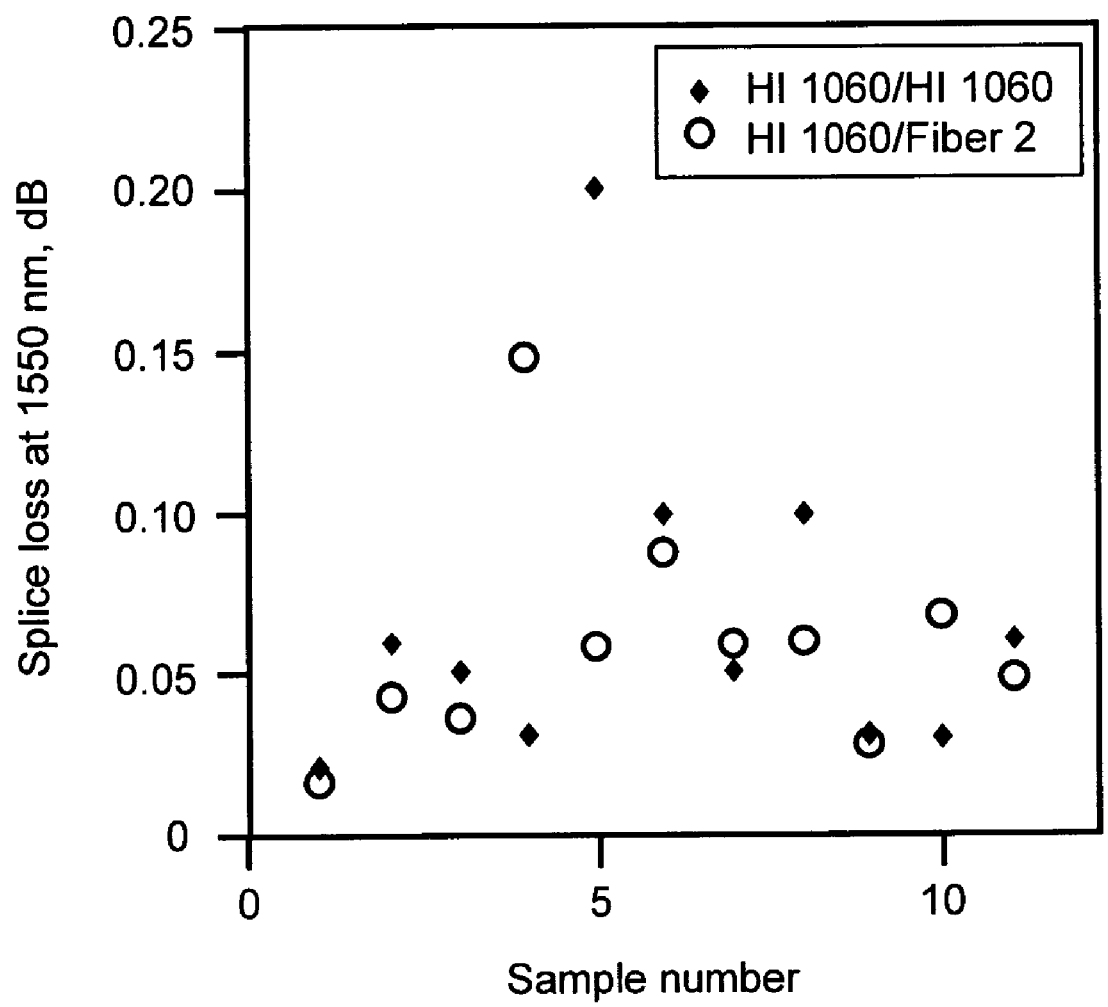
FIG. 2 is a plot showing the results of splicing an optical fiber of the present invention to a conventional optical fiber.

The optical fibers of the present invention are designed with numerical apertures appropriate to allow coupling to standard optical fibers with low optical loss. Fiber 2 of Table 1 was designed to have a numerical aperture similar to that of PUREMODE™ HI 1060 optical fiber. FIG. 2 is a plot comparing the results of splicing fiber 2 of Table 1 with PUREMODE™ HI 1060 with the results of splicing PUREMODE™ HI 1060 to itself. Eleven splices of each combination were made. The splice parameters used were those found in the menu of a FUJIKURA 40S fusion splicer for a PUREMODE™ HI 1060-PUREMODE™ HI 1060 splice. The average splice loss for fiber 2 of Table 1 with PUREMODE™ HI 1060 was less than 1 dB, and was statistically similar to the splice loss for PUREMODE™ HI 1060 with itself.

The optical fibers disclosed herein may be made by standard optical fiber fabrication processes, as will be apparent to the skilled artisan. For example, a fiber preform may be constructed using modified chemical vapor deposition (MCVD), outside vapor deposition (OVD), vapor axial deposition (VAD), or rod-in-tube processes. Standard consolidation and draw processes may be used in the fabrication of an optical fiber from the preform. Thus, the refractive index and compositional profiles of the optical fibers disclosed herein may be accomplished using manufacturing techniques known to those skilled in the art including, but in no way limited to, OVD, VAD and MCVD processes.

Another aspect of the present invention relates to a method of fabricating a fiber Bragg grating in one of the optical fibers described hereinabove. In one embodiment of the invention, the method includes the steps of providing an optical fiber having a core, the core including silica doped with at least about 6 mol % germania and at least about 0.9 wt % fluorine, and a cladding surrounding the core; and exposing a section of the optical fiber to patterned UV radiation, thereby writing the grating in the core of the fiber. The exposure is suitably performed without hydrogen loading of the fiber. This method may be used with the optical fibers of the present invention to make efficient fiber Bragg gratings without the use of a hydrogen loading process.

Another aspect of the present invention includes a fiber Bragg grating fabricated in one of the optical fibers described hereinabove. For example, one embodiment of the invention includes an optical fiber having a core, the core including silica doped with at least about 6 mol % germania and at least about 0.9 wt % fluorine, and a cladding surrounding the core, wherein a fiber Bragg grating is present in the core of the optical fiber. Fiber Bragg gratings of the present invention may be coupled with low loss to other optical fibers in an optical communications system.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An optical fiber comprising a core comprising silica and a cladding surrounding the core characterized in that the core is doped with at least about 6 mol % germania and at least about 0.9 wt % fluorine, wherein the core has a ratio of saturated index change at 1550 nm in the absence of hydrogen loading to numerical aperture is at least about $9.0 \times 10^{-2}$.

2. The optical fiber of claim 1, wherein the core is doped with at least about 7 mol % germania.

3. The optical fiber of claim 1, wherein the core is doped with at least about 1.2 wt % fluorine.

4. The optical fiber of claim 1, wherein the core is substantially devoid of boron.

5. The optical fiber of claim 1, wherein the core includes no other dopants in substantial amounts.

6. The optical fiber of claim 1, wherein the optical fiber has a numerical aperture of less than about 0.22 at 1550 nm.

7. The optical fiber of claim 1, wherein the core exhibits an index change of at least about $5.5 \times 10^{-4}$ at a wavelength of 1550 nm when exposed to a dose of radiation having a wavelength of 244 nm and an energy of 428 J through a phase mask yielding an interference pattern with a visibility of about 80%, said exposure being performed without hydrogen loading of the optical fiber.

8. The optical fiber of claim 1 wherein the core exhibits a ratio of index change at 1550 nm to numerical aperture of at least about $3.0 \times 10^{-3}$ the index change being caused by an exposure in the absence of hydrogen loading to a dose of radiation having a wavelength of 244 nm and an energy of 428 J through a phase mask yielding an interference pattern with a visibility of about 80%.

9. The optical fiber of claim 1, wherein a Bragg grating is present in the core of the optical fiber.

10. The optical fiber of claim 1, wherein the cladding comprises a material selected from the group consisting of substantially undoped silica, germania-fluorine co-doped silica, and phosphorus-fluorine co-doped silica.

11. A method of fabricating a fiber Bragg grating, the method comprising the steps of providing an optical fiber comprising
   a core, the core comprising silica doped with at least about 6 mol % germanium and at least about 0.9 wt % fluorine , wherein the core has a ratio of saturated index change at 1550 nm in the absence of hydrogen loading to numerical aperture of at least about $9.0 \times 10^{-2}$, and
   a cladding surrounding the core; and
   exposing a section of the optical fiber to patterned UV radiation, thereby writing the grating in the core of the fiber.

12. The method of claim 11, wherein the exposure is performed without hydrogen loading of the fiber.

13. The method of claim 11, wherein the core of the optical fiber is doped with at least about 7 mol % germania.

14. The method of claim 11, wherein the core of the optical fiber is doped with at least about 1.2 wt % fluorine.

15. The method of claim 11, wherein the core of the optical fiber is substantially devoid of boron.

16. The method of claim 11, wherein the core of the optical fiber includes no other dopants in substantial amounts.

17. The method of claim 11, wherein the optical fiber has a numerical aperture of less than about 0.22 at 1550 nm.

* * * * *